Feb. 17, 1970 T. N. THIELE 3,496,450
MEANS FOR REGULATING LOAD VOLTAGE IN AN ELECTROCHEMICAL
BATTERY POWER SYSTEM
Filed July 17, 1967
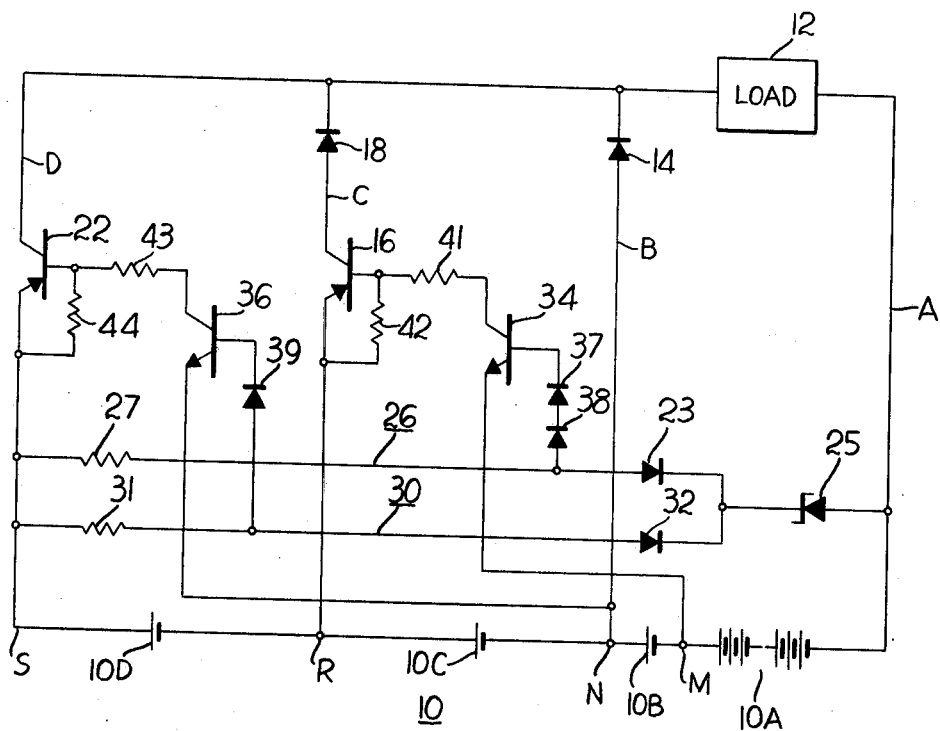
Inventor
Tom N. Thiele
By R J Falkowski
Attorney

United States Patent Office 3,496,450
Patented Feb. 17, 1970

3,496,450
MEANS FOR REGULATING LOAD VOLTAGE IN AN ELECTROCHEMICAL BATTERY POWER SYSTEM
Tom N. Thiele, Milwaukee, Wis., assignor to Allis-Chalmers Manufacturing Company, Milwaukee, Wis.
Filed July 17, 1967, Ser. No. 653,709
Int. Cl. G05f 1/62; H02j 7/36
U.S. Cl. 323—15         1 Claim

ABSTRACT OF THE DISCLOSURE

A fuel cell battery is connected to furnish power to a load. Taps or connections between portions of the fuel cell battery are selectively connectable to the load through transistor switching circuits to energize the load from the number of fuel cells required to maintain a selected load voltage even with significantly varying current requirements. The transistor switching circuits are controlled by transistor sensing circuits that are connected to turn on or off an associated switching transistor in response to a measure of the load voltage.

---

This invention relates to means for controlling voltage across a load powered by an electrochemical battery power source, particularly it relates to means responsive to the load voltage to connect the number of cells of the battery to the load required to keep the load voltage at a preselected minimum level.

When an electrochemical battery such as a fuel cell battery is used to power a load that has significantly varying current requirements, it is often necessary to have some means to control the power supply level. Otherwise, the load voltage drops below required levels as the load current increases and this can cause inefficient operation of the battery and load. With this invention means are provided for sensing and responding to the load voltage to control the number of cells connected into the load circuit to keep the load voltage within the desired limits.

The drawing is a schematic of a fuel cell battery circuit embodying this invention.

Referring to the drawing, a load 12 is powered by a fuel cell battery 10 from a negative, or common, terminal along a conductor A and from a selected positive power terminal N, R or S along conductors B, C or D, respectively. Fuel cell battery 10 comprises any appropriate number of fuel cells connected in series and having points or connections for segregating the battery into selected portions with a main power portion 10A for providing the major portion of the energy for the load and additional selected portions illustrated as cells 10B, 10C and 10D for furnishing selected sensing points and additional power portions. Connections are made to obtain a first sensing point, or terminal, M between battery portions 10A and 10B and a second sensing point, or terminal, N between battery portions 10B and 10C. A connecting means connects portions of the fuel cell battery at a low power level along conductors A and B from point N through a power diode 14, at an intermediate level along conductors A and C from point R through a power diode 18 and a switching means such as a switching transistor 16, and at a high level along conductors A and D from point S through a switching means such as a switching transistor 22. Power diodes 14 and 18 provide means for decoupling the lower portion terminal from the load when the load is energized from a higher power portion terminal.

A sensing means comprises parallelly connected level sensing circuits 26 and 30, sensing transistors 34 and 36, voltage reference devices for each sensing transistor such as base diodes 37, 38 and 39 and a reference means such as a Zener diode 25 connected across the fuel cell battery to provide a substantially constant preselected common reference voltage point at its cathode. Circuit 26 comprises a resistor 27 and a decoupling diode 23 and circuit 30 comprises a resistor 31 and a decoupling diode 32.

In the operation of the circuit shown, the voltage across the load is sensed by comparing a measure of the load voltage taken from a selected voltage level in the battery, such as at voltage sensing point M or N, to selected reference voltages at the bases of transistors 34 and 36, respectively. The selected reference voltages are determined by the common reference voltage, that is, the breakover voltage level of Zener diode 25, and the reference voltage devices connected between Zener diode 25 and the base of each sensing transistor. Therefore, the selected reference voltage for sensing transistor 34 is dependent on the characteristics of base diodes 37 and 38, decoupling diode 23, and the base-emitter junction of sensing transistor 34; and the selected reference voltage for sensing transistor 36 is dependent on the characteristics of base diode 39, decoupling diode 32, and the base-emitter junction of sensing transistor 36. By selecting the common reference voltage device, Zener diode 25, and the components in the base-emitter circuit of the sensing transistors, the conduction voltage level of the sensing transistors can be selected as required for a particular application.

When load 12 is energized through conductors B and A from power point N and the load voltage drops below a first preselected level, this drop is reflected in the voltage at sensing point M. If the voltage at point M is sufficiently low relative to the common reference voltage to provide a forward bias to transistor 34 exceeding the voltage drop across the base-emitter of sensing transistor 34, base diodes 37 and 38, and decoupling diode 23, transistor 34 turns on. With transistor 34 turned on, current flows from sensing point M through the emitter-collector of transistor 34, a base resistor 41, and the base-emitter of transistor 16. This turns on transistor 16 as forward biasing voltage appears across a resistor 42 to connect point R of the battery to the load through the emitter-collector of transistor 16 and diode 18. Diode 14 isolates the lower voltage point N from the load.

Similarly, when load 12 is energized through conductors C and A from power point R with transistor 16 turned on and the load voltage drops below a second preselected level, which may be selected to be substantially the same as the first preselected level, this drop is reflected in the voltage at sensing point N. If the voltage at point N is sufficiently low relative to the common reference voltage to provide a forward bias to transistor 36 exceeding the voltage drop across the base-emitter of sensing transistor 36, base diode 39, and decoupling diode 32, transistor 36 turns on. With transistor 36 turned on, current flows from sensing point N through the emitter-collector of transistor 36, a base resistor 43, and the base-emitter of transistor 22. This turns on transistor 22 as forward biasing voltage appears across a resistor 44 to connect point S and all the illustrated fuel cell battery portions 10A, 10B, 10C and 10D to the load through the emitter-collector of transistor 22. Diode 18 isolates the lower voltage point R from the load.

When sensing transistor 34 or 36 turns on, there is a rapid turn-on and regenerative switching effect because as a sensing transistor turns on, the current through its base-emitter increases as the voltage at the emitter decreases. The voltage at the emitter decreases as transistors 16 or 22 begin to conduct because the connection of additional cells to the load increases the total battery current and thereby the voltage drop across any cell or group of cells.

When the load is powered by the full battery voltage, that is, from point S with switching transistor 22 turned on, and the load voltage increases above a level determined in the same manner as the first preselected level, the situation described for turning on the switching transistor is reversed. When the emitter of sensing transistor 36 becomes sufficiently less negative relative to its base, sensing transistor 36 turns off to turn off switching transistor 22 and disconnect point S from the load. Similarly, if the voltage across the load further increases above a level determined in the same manner as the second preselected level, sensing transistor 34 and switching transistor 16 turns off and disconnects point R from the load.

The turning off of the sensing transistors because of an increased load voltage is also regenerative because as a sensing transistor turns off, its emitter voltage becomes more positive as the battery voltage rises in response to the decreased battery current.

In describing the invention, the preferred embodiment has been shown and described, but it is obvious to one skilled in the art that there are many variations, combinations, alterations and modifications that may be made without departing from the spirit of the invention.

The embodiments of the invention in which an exclusive property or privilege is claimed are defined as follows:

1. Means for controlling the voltage across a varying load comprising, in combination,
   a battery having a main power portion including a plurality of cells, a first additive portion including at least one cell connected to one end of said main power portion in polarity aiding relation, and a second additive portion including at least one cell connected to said first additive portion in polarity aiding relation to said battery,
   means including a diode connecting said main power portion to said load in a forward biased direction relative to said battery polarity,
   means connected across said battery and including a Zener diode for establishing a reference voltage point,
   first switching means including a first transistor switch for connecting said first additive portion to said load and also including a sensing transistor having an emitter-base input circuit connected between said reference voltage point and a first voltage sensing point in the battery and responsive to the difference in potential therebetween for turning on said first transistor switch when said difference in potential is greater than a predetermined level,
   a diode in series with first transistor switch biased in a forward direction relative to the polarity of said first additive portion,
   second switching means including a second transistor switch for connecting said second additive portion to said load and also including a second sensing transistor having an emitter-base input circuit connected between said reference voltage point and a second voltage sensing point in said battery at the junction between said main power portion and said first additive portion and being responsive to the potential difference therebetween to turn on said second transistor switch when said potential difference is greater than a predetermined level,
   the increase in the voltage drop across said battery, incident to the turning on of said first and of second transistor switches and the resultant increase in load current when each said transistor switch is turned on, varying the potential at said voltage sensing points in a direction to increase the potential difference between said voltage sensing points and said reference voltage point, whereby switching is regenerative and said transistor switches are on or off.

References Cited

UNITED STATES PATENTS 3,343,073    9/1967    Mesenhimer _____ 323—15

LEE T. HIX, Primary Examiner

G. GOLDBERG, Assistant Examiner

U.S. Cl. X.R.

307—49, 50, 61; 320—17, 50; 323—22